United States Patent
Nakayama

(10) Patent No.: US 6,265,508 B1
(45) Date of Patent: Jul. 24, 2001

(54) METAL SURFACE TREATMENT AGENT HAVING THIOPHENECARBOXYLIC ACID ESTER-CONTAINING AND PHOSPHORIC ACID ESTER-CONTAINING POLYMERIZABLE MONOMER GROUPS

(75) Inventor: Mizuki Nakayama, Tokyo (JP)

(73) Assignee: GC Corporation, Tokyo (JP)

( * ) Notice: Subject to any disclaimer, the term of this patent is extended or adjusted under 35 U.S.C. 154(b) by 0 days.

(21) Appl. No.: 09/204,158

(22) Filed: Dec. 3, 1998

(30) Foreign Application Priority Data

Dec. 11, 1997 (JP) .................................................. 9-361646

(51) Int. Cl.[7] .................................................. C08F 128/06
(52) U.S. Cl. .................................................. 526/256
(58) Field of Search .................................................. 526/256

(56) References Cited

U.S. PATENT DOCUMENTS 5,919,836 * 7/1999 Reinhardt .............................. 523/118

* cited by examiner

*Primary Examiner*—Bernard Lipman
(74) *Attorney, Agent, or Firm*—Oblon, Spivak, McCelland, Maier & Neustadt, P.C.

(57) ABSTRACT

A metal surface treatment agent is disclosed, comprising from 0.001 to 10% by weight of a polymerizable monomer containing a thiophenecarboxylic acid ester group therein and from 0.001 to 10% by weight of a polymerizable monomer containing a phosphoric acid ester group therein dissolved in an organic solvent. According to the invention, there is provided a metal surface treatment agent which can impart a high adhesive strength with superior durability to various metals including base metals to noble metals in adhesion of a macromolecular material to a metal by extremely simple processing and is good in storage stability.

2 Claims, No Drawings

METAL SURFACE TREATMENT AGENT HAVING THIOPHENECARBOXYLIC ACID ESTER-CONTAINING AND PHOSPHORIC ACID ESTER-CONTAINING POLYMERIZABLE MONOMER GROUPS

FIELD OF THE INVENTION

The present invention relates to a metal surface treatment agent which is used for applying in advance a metal surface as an adherend in adhering a macromolecular material to a metal by using an adhesive.

BACKGROUND OF THE INVENTION

In adhesion of a macromolecular material to a metal, as compared with the adhesion to a base metal such as cobalt, chromium, nickel, titanium, iron, and copper, or an alloy thereof, the adhesion to a chemically stable noble metal such as gold, platinum, and palladium, or a noble metal alloy containing such a noble metal as a major component is extremely difficult, and hence, the present situation is that any thoroughly satisfactory adhesion technologies have not yet been established.

As attempts for improving the adhesive properties to a noble metal, there have been proposed some methods for applying a primer onto a metal surface as an adherend, a method for sandblasting to physically roughing a metal surface as an adherend, a method for plating a metal surface as an adherend with tin, a method for subjecting a metal surface as an adherend to oxidation processing, and the like.

Of these methods, the method for applying a primer onto a metal surface as an adherend is simplest, and examples of such method include a method in which 6-(4-vinylbenzyl-n-propyl)amino-1,3,5-triazine-2,4-dithione (hereinafter referred to as "VBATDT") is used as a primer to be applied, as disclosed in Japanese Patent Laid-Open No. 64-83254, and method in which a polymerizable monomer containing a thiophosphoric acid group therein is used as a primer to be applied, as disclosed in Japanese Patent Laid-Open No. 1-138282 and Japanese Patent Laid-Open No. 3-310122.

Although many of the above-described conventional technologies are admitted to have an effect for increasing the adhesive strength under dry conditions, they involve such a defect that the water resistance or durability is poor.

Of the methods for applying a primer onto a metal surface as an adherend, the method of using VBATDT can not be said to be sufficient in an effect for improving the adhesive properties to any of base metals or noble metals; and while the method of using a monomer containing a thiophosphoric acid group therein is admitted to have an effect for improving the adhesive properties, this method not only has a problem in storage or handling of the primer, because the substance itself is unstable, but also involves such a problem that the water resistance or durability is inferior.

SUMMARY OF THE INVENTION

Thus, an object of the present invention is to provide a metal surface treatment agent which can impart a high adhesive strength with superior durability to various metals including base metals to noble metals in adhesion of a macromolecular material to a metal by extremely simple processing and is good in storage stability.

In order to achieve the above-described object, the present inventor made extensive and intensive investigations. As a result, while paying attention to a polymerizable monomer containing a phosphoric acid ester group therein which is inferior in adhesive properties to noble metals but superior in adhesive properties to base metals, a polymerizable monomer was combined with a polymerizable monomer containing a thiophenecarboxylic acid ester group therein which is superior in adhesive properties to a noble metal. As a result, a success was achieved in making a metal surface treatment agent which is superior in adhesive properties to various metals including base metals to noble metals, has superior adhesive properties to various metals and superior durability by synergistic effects thereof, as compared with the case in which an individual monomer is used, is good in storage stability, and is easy for handling, leading to accomplishment of the present invention.

That is, the present invention is to provide a metal surface treatment agent comprising from 0.001 to 10% by weight of a polymerizable monomer containing a thiophenecarboxylic acid ester group therein and from 0.001 to 10% by weight of a polymerizable monomer containing a phosphoric acid ester group therein dissolved in an organic solvent.

DETAILED DESCRIPTION OF THE INVENTION

As the polymerizable monomer containing the thiophenecarboxylic acid ester group therein, compounds represented by the following chemical formulae can be used:

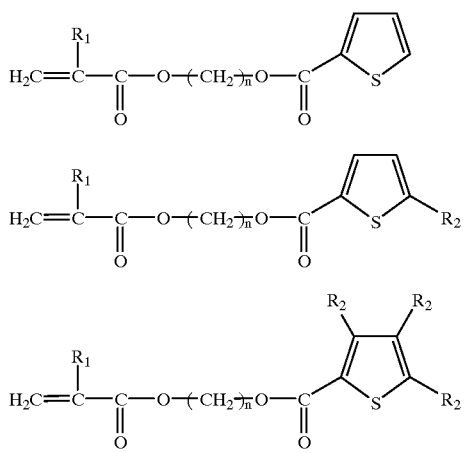

-continued

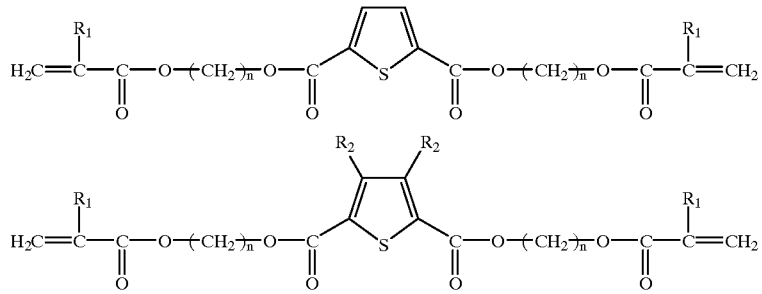

wherein $R_1$ is H or $CH_3$; $R_2$ is H, Cl, COOH, COCl, $CONH_2$, or CN; and n is an integer of 2 to 16.

Specific examples include 2-thiophenecarboxylic acid-2-(meth)acryloyloxyethyl ester, 2,5-thiophenedicarboxylic acid hydrogen-2-(meth)acryloyloxyethyl ester, 2,5-thiophenedicarboxylic acid di(2-(meth)acryloyloxyethyl) ester, 2-thiophenecarboxylic acid-4-(meth)acryloyloxybutyl ester, 2,5-thiophenedicarboxylic acid hydrogen-4-(meth)acryloyloxybutyl ester, 2,5-thiophenedicarboxylic acid di(4-(meth)acryloyloxybutyl) ester, 2-thiophenecarboxylic acid-6-(meth)acryloyloxyhexyl ester, 2,5-thiophenedicarboxylic acid hydrogen-6-(meth)acryloyloxyhexyl ester, 2,5-thiophenedicarboxylic acid di(2-(meth)acryloyloxyhexyl) ester, 2-thiophenecarboxylic acid-8-(meth)acryloyloxyoctyl ester, 2,5-thiophenedicarboxylic acid hydrogen-8-(meth)acryloyloxyoctyl ester, 2,5-thiophenedicarboxylic acid-di(8-(meth)acryloyloxyoctyl)ester, 2-thiophenecarboxylic acid-10-(meth)acryloyloxydecyl ester, 2,5-thiophenedicarboxylic acid hydrogen-10-(meth)acryloyloxydecyl ester, 2,5-thiophenedicarboxylic acid-di(10-(meth)acryloyloxydecyl) ester, 2-thiophenecarboxylic acid-12-(meth)acryloyloxydodecyl ester, 2,5-thiophenedicarboxylic acid hydrogen-12-(meth)acryloyloxydodecyl ester, 2,5-thiophenedicarboxylic acid-di(12-(meth)acryloyloxydodecyl) ester, 2-thiophenecarboxylic acid-14-(meth)acryloyloxytetradecyl ester, 2,5-thiophenedicarboxylic acid hydrogen-14-(meth)acryloyloxytetradecyl ester, 2,5-thiophenedicarboxylic acid-di(14-(meth)acryloyloxytetradecyl) ester, 2-thiophenecarboxylic acid-16-(meth)acryloyloxyhexadecyl ester, 2,5-thiophenedicarboxylic acid hydrogen-16-(meth)acryloyloxyhexadecyl ester, and 2,5-thiophenedicarboxylic acid-di(16-(meth)acryloyloxyhexadecyl) ester.

Of these compounds are particularly preferred 2-thiophenecarboxylic acid-2-(meth)acryloyloxyethyl ester, 2,5-thiophenedicarboxylic acid hydrogen-2-(meth)acryloyloxyethyl ester, 2,5-thiophenedicarboxylic acid di(2-(meth)acryloyloxyethyl) ester, 2-thiophenecarboxylic acid-10-(meth)acryloyloxydecyl ester, 2,5-thiophenedicarboxylic acid hydrogen-10-(meth)acryloyloxydecyl ester, and 2,5-thiophenedicarboxylic acid-di(10-(meth)acryloyloxydecyl) ester because their raw materials are readily available and do not require complicated synthesis methods.

In addition, as the polymerizable monomer containing the phosphoric acid ester group therein, compounds represented by the following chemical formula can be used:

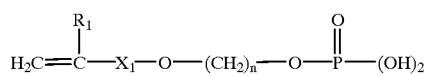

wherein $R_1$ is H or $CH_3$;

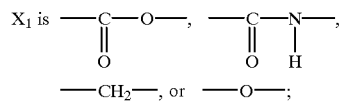

and n is an integer of 2 to 16.

Specific examples include 2-(meth)acryloyloxyethyl phosphate, 4-(meth)acryloyloxybutyl phosphate, 6-(meth)acryloyloxyhexyl phosphate, 8-(meth)acryloyloxyoctyl phosphate, 10-(meth)acryloyloxydecyl phosphate, 12-(meth)acryloyloxydodecyl phosphate, 14-(meth)acryloyloxytetradecyl phosphate, and 16-(meth)acryloyloxyhexadecyl phosphate.

Of these compounds are particularly preferred 2-(meth)acryloyloxyethyl phosphate and 10-(meth)acryloyloxydecyl phosphate because their raw materials are readily available and do not require complicated synthesis methods.

Examples of the organic solvent which dissolves therein the polymerizable monomer containing the thiophenecarboxylic acid ester group therein and the polymerizable monomer containing the phosphoric acid ester group include acetone, methyl ethyl ketone, tetrahydrofuran, dioxane, ethyl acetate, methyl methacrylate, chloroform, dichloromethane, benzene, and toluene. These compounds can be used singly or in admixture of two or more thereof.

A suitable concentration of the polymerizable monomer containing the thiophenecarboxylic acid ester group therein and a suitable concentration of the polymerizable monomer containing the phosphoric acid ester group therein are each in a range of from 0.001 to 10% by weight based on the weight of the organic solvent. If the concentration of each of the polymerizable monomers is less than 0.001% by weight, satisfactory adhesive properties are not obtained, whereas if it exceeds 10% by weight, no further effect for improving the adhesive properties is obtained. Of these concentrations is particularly preferred a range of from 0.001 to 5% by weight for each of the polymerizable monomers. This is presumably because the components which influence the adhesion exhibit their effects in very low concentrations.

The metal surface which has been applied in advance with the metal surface treatment agent according to the present invention is provided for adhesion to a macromolecular material by using a polymerization-setting adhesive containing a polymerizable double bond-containing therein monomer as a component. The metal surface treatment agent according to the present invention can be widely applied to various metals including base metals to noble metals, such as gold, platinum, silver, palladium, cobalt, chromium, nickel, titanium, iron, tin, zinc, and copper, and alloys thereof. Though the technologies in the art have hitherto relied on the tin-plating method or the oxidation processing method, by using the metal surface treatment agent according to the present invention, a high adhesive strength with superior durability to various metals including base metals to noble metals can be obtained through a simple method of applying and drying.

In addition, the metal surface treatment agent according to the present invention is constituted by a substance with superior stability and is superior in storage stability to the conventional surface treatment agent using a monomer containing a thiophosphoric acid group therein.

The present invention is hereunder described in more detail with reference to the following Examples, but it should not be construed that the invention is limited to these Examples.

EXAMPLE 1

A metal surface treatment agent comprising the following components was prepared.

| | |
|---|---|
| Methyl methacrylate | 99.989% by weight |
| 2-Thiophenecarboxylic acid-10-methacryloyloxydecyl ester | 0.001% by weight |
| 10-Methacryloyloxydecyl phosphate | 0.01% by weight |

The adhesion test was carried out in the following manner. That is, a metal cylinder having a diameter of 8 mm and a height of 5 mm was subjected to finishing polishing by using a silicon carbide polishing paper #1000. After cleaning a surface of the metal cylinder with acetone, the above-described metal surface treatment agent was applied onto the metal surface by means of a brush. Dried by allowing it to stand for one minute, then in order to define an adhesive area on the surface, a masking tape provided with a hole having a diameter of 3 mm was laminated thereon. An adhesive paste composed of methyl methacrylate and polymethyl methacrylate, containing a 10% by weight of a tributylborane partially oxide (TBBO) was placed thereon, and an acrylic rod was pressed thereon, whereby the both were adhered to each other. The thus prepared specimen was placed in water at 37° C. for one day then, subjected to a thermal cycle test by alternatively dipping in water at 4° C. and 60° C., respectively for 30 seconds by 2,000 times, and then subjected to a tensile test at a rate of 1 mm/min. The adhesive strength was measured with respect to five specimens, thereby calculating an average value thereof.

The metals to be used for these tests were Cast Well M.C. Gold 12% (a trade name of GC Corporation) as a gold-silver-palladium alloy, Casting Cold M.C. Type IV (a trade name of GC Corporation) as a gold alloy, and T-Alloy (a trade name of GC Corporation) as titanium alloy. The results obtained are summarized in Table 1.

EXAMPLE 2

A metal surface treatment agent comprising the following components was prepared and then subjected to an adhesion test in the same manner as in Example 1.

| | |
|---|---|
| Methyl methacrylate | 99.89% by weight |
| 2-Thiophenecarboxylic acid-10-methacryloyloxydecyl ester | 0.01% by weight |
| 10-Methacryloyloxydecyl phosphate | 0.1% by weight |

EXAMPLE 3

A metal surface treatment agent comprising the following components was prepared and then subjected to an adhesion test in the same manner as in Example 1.

| | |
|---|---|
| Chloroform | 99.6% by weight |
| 2-Thiophenecarboxylic acid-10-methacryloyloxydecyl ester | 0.1% by weight |
| 10-Methacryloyloxydecyl phosphate | 0.3% by weight |

EXAMPLE 4

A metal surface treatment agent comprising the following components was prepared and then subjected to an adhesion test in the same manner as in Example 1.

| | |
|---|---|
| Dichloromethane | 98.6% by weight |
| 2-Thiophenecarboxylic acid-10-methacryloyloxydecyl ester | 1.0% by weight |
| 10-Methacryloyloxydecyl phosphate | 0.4% by weight |

EXAMPLE 5

A metal surface treatment agent comprising the following components was prepared and then subjected to an adhesion test in the same manner as in Example 1.

| | |
|---|---|
| Acetone | 94.5% by weight |
| 2-Thiophenecarboxylic acid-10-methacryloyloxydecyl ester | 5.0% by weight |
| 10-Methacryloyloxydecyl phosphate | 0.5% by weight |

EXAMPLE 6

A metal surface treatment agent comprising the following components was prepared and then subjected to an adhesion test in the same manner as in Example 1.

| | |
|---|---|
| Methyl methacrylate | 99.0% by weight |
| 2,5-Thiophenedicarboxylic acid hydrogen-10-methacryloyloxydecyl ester | 0.5% by weight |
| 10-Methacryloyloxydecyl phosphate | 0.5% by weight |

EXAMPLE 7

A metal surface treatment agent comprising the following components was prepared and then subjected to an adhesion test in the same manner as in Example 1.

| | |
|---|---|
| Methyl methacrylate | 99.0% by weight |
| 2,5-Thiophenedicarboxylic acid di (10-methacryloyloxydecyl) ester | 0.5% by weight |
| 10-Methacryloyloxydecyl phosphate | 0.5% by weight |

Comparative Example 1

The adhesion test was carried out in the same manner as in Example 1, except that no metal surface treatment agent was used.

Comparative Example 2

A metal surface treatment agent comprising the following components was prepared and then subjected to an adhesion test in the same manner as in Example 1.

| | |
|---|---|
| Acetone | 97.5% by weight |
| 4-Methacryloxyethoxycarbonyl phthalic anhydride | 2.5% by weight |

Comparative Example 3

A metal surface treatment agent comprising the following components was prepared and then subjected to an adhesion test in the same manner as in Example 1.

| | |
|---|---|
| Acetone | 97.5% by weight |
| 6-(4-Vinylbenzyl-n-propyl) amino-1,3,5-triazine-2,4-dithione (VBATDT) | 2.5% by weight |

Comparative Example 4

A metal surface treatment agent comprising the following components was prepared and then subjected to an adhesion test in the same manner as in Example 1.

| | |
|---|---|
| Methyl methacrylate | 99.9% by weight |
| 2-Thiophenecarboxylic acid-10-methacryloyloxydecyl ester | 0.1% by weight |

Comparative Example 5

A metal surface treatment agent comprising the following components was prepared and then subjected to an adhesion test in the same manner as in Example 1.

| | |
|---|---|
| Methyl methacrylate | 99.9% by weight |
| 2,5-Thiophenedicarboxylic acid hydrogen-10-methacryloyloxydecyl ester | 0.1% by weight |

Comparative Example 6

A metal surface treatment agent comprising the following components was prepared and then subjected to an adhesion test in the same manner as in Example 1.

| | |
|---|---|
| Methyl methacrylate | 99.9% by weight |
| 2,5-Thiophenedicarboxylic acid di (10-methacryloyloxydecyl) ester | 0.1% by weight |

Comparative Example 7

A metal surface treatment agent comprising the following components was prepared and then subjected to an adhesion test in the same manner as in Example 1.

| | |
|---|---|
| Methyl methacrylate | 99.5% by weight |
| 10-Methacryloyloxydecyl phosphate | 0.5% by weight |

The results obtained in the Examples and Comparative Examples are shown in Table 1.

TABLE 1

[Tensile adhesive strength to various metals (unit: MPa)]

| | Gold-silver-palladium alloy | Gold alloy | Titanium alloy |
|---|---|---|---|
| Example 1 | 19.7 | 17.9 | 24.2 |
| Example 2 | 23.6 | 22.7 | 30.1 |
| Example 3 | 22.9 | 22.3 | 35.7 |
| Example 4 | 25.1 | 24.4 | 33.7 |
| Example 5 | 21.2 | 20.9 | 28.6 |
| Example 6 | 26.0 | 24.1 | 37.8 |
| Example 7 | 24.5 | 22.6 | 30.9 |
| Comparative Example 1 | — | — | — |
| Comparative Example 2 | — | — | 8.5 |
| Comparative Example 3 | 2.6 | 5.3 | 0.1 |
| Comparative Example 4 | 16.1 | 14.4 | 3.8 |
| Comparative Example 5 | 15.9 | 13.6 | 4.5 |
| Comparative Example 6 | 14.3 | 13.3 | 3.1 |
| Comparative Example 7 | 1.7 | 1.0 | 12.0 |

(Note): "—" means the occurrence of dropping-out after the thermal cycle test.

It can be understood from the results as shown in Table 1 that in case of a single use of the polymerizable monomer containing the thiophenecarboxylic acid ester group therein (Comparative Examples 4 to 6), the adhesive properties are high, as compared with the case of a single use of 4-methacryloyloxyethoxycarbonyl phthalic anhydride (Comparative Example 2) or 6-(4-Vinylbenzyl-n-propyl) amino-1,3,5-triazine-2,4-dithione (Comparative Example 3); and that in case of a single use of the polymerizable monomer containing the phosphoric acid ester group therein (Comparative Example 7), while the adhesion durability to a noble metal is inferior, the adhesion durability to a base metal is superior, as compared with the case of a single use of the polymerizable monomer containing the thiophenecarboxylic acid ester group therein. In contrast, it can also be understood that in case of a combined use of the polymerizable monomer containing the thiophenecarboxylic acid ester group therein with polymerizable monomer containing the phosphoric acid ester group therein (Examples 1 to 7), the adhesion durability is markedly superior by their synergistic effect, as compared with the case of a single use of each of the polymerizable monomer (Comparative Examples 4 to 7).

In the light of the above, the metal surface treatment agent according to the present invention is effective to various metals, enables to achieve the adhesion with quite ease to a noble metal (according to the conventional manners, the adhesion to a noble metal is difficult and has required a complicated method such as tin-plating or oxidation processing) by a simple process of application and drying of the metal surface treatment agent according to the present invention, and makes it possible to obtain a high adhesive strength with superior durability to various metals including from base metals to noble metals. Therefore, the present invention is very valuable from the industrial standpoint.

While the invention has been described in detail and with reference to specific embodiments thereof, it will be apparent to one skilled in the art that various changes and modifications can be made therein without departing from the spirit and scope thereof.

What is claimed is:

1. A metal surface treatment agent comprising from 0.001 to 10% by weight of a polymerizable monomer containing a thiophenecarboxylic acid ester group therein and from 0.001 to 10% by weight of a polymerizable monomer containing a phosphoric acid ester group therein dissolved in an organic solvent:

wherein said polymerizable monomer containing a thiophenecarboxylic acid ester group therein is at least one member selected from compounds represented by the following chemical formulae:

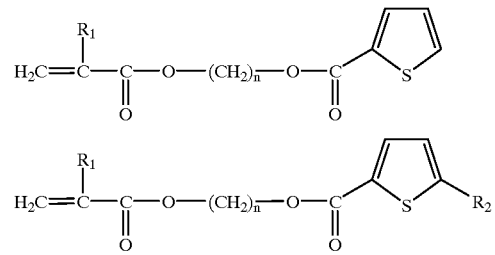

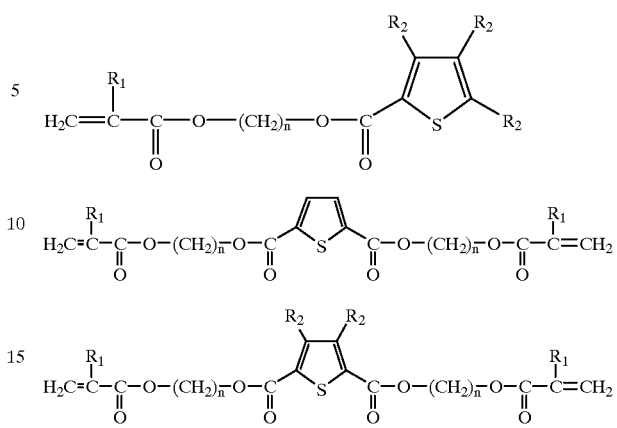

wherein $R_1$ is H or $CH_3$; $R_2$ is H, Cl, COOH, COCl, $CONH_2$, or CN; and n is an integer of from 2 to 16; and wherein said polymerizable monomer containing a phosphoric acid ester group therein is at least one member selected from compounds represented by the following chemical formula:

$$H_2C=\underset{R_1}{C}-X_1-(CH_2)_n-O-\underset{\underset{O}{\|}}{P}-(OH)_2$$

wherein $R_1$ is H or $CH_3$;

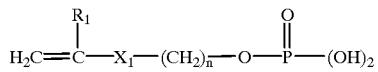

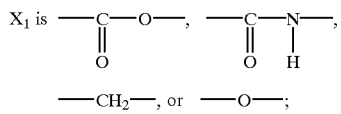

and n is an integer of from 2 to 16.

2. A metal surface treatment agent as claimed in claim 1, wherein said organic solvent is at least one member selected from acetone, methyl ethyl ketone, tetrahydrofuran, dioxane, ethyl acetate, methyl methacrylate, chloroform, dichloromethane, benzene, and toluene.

* * * * *